Patented Dec. 27, 1927.

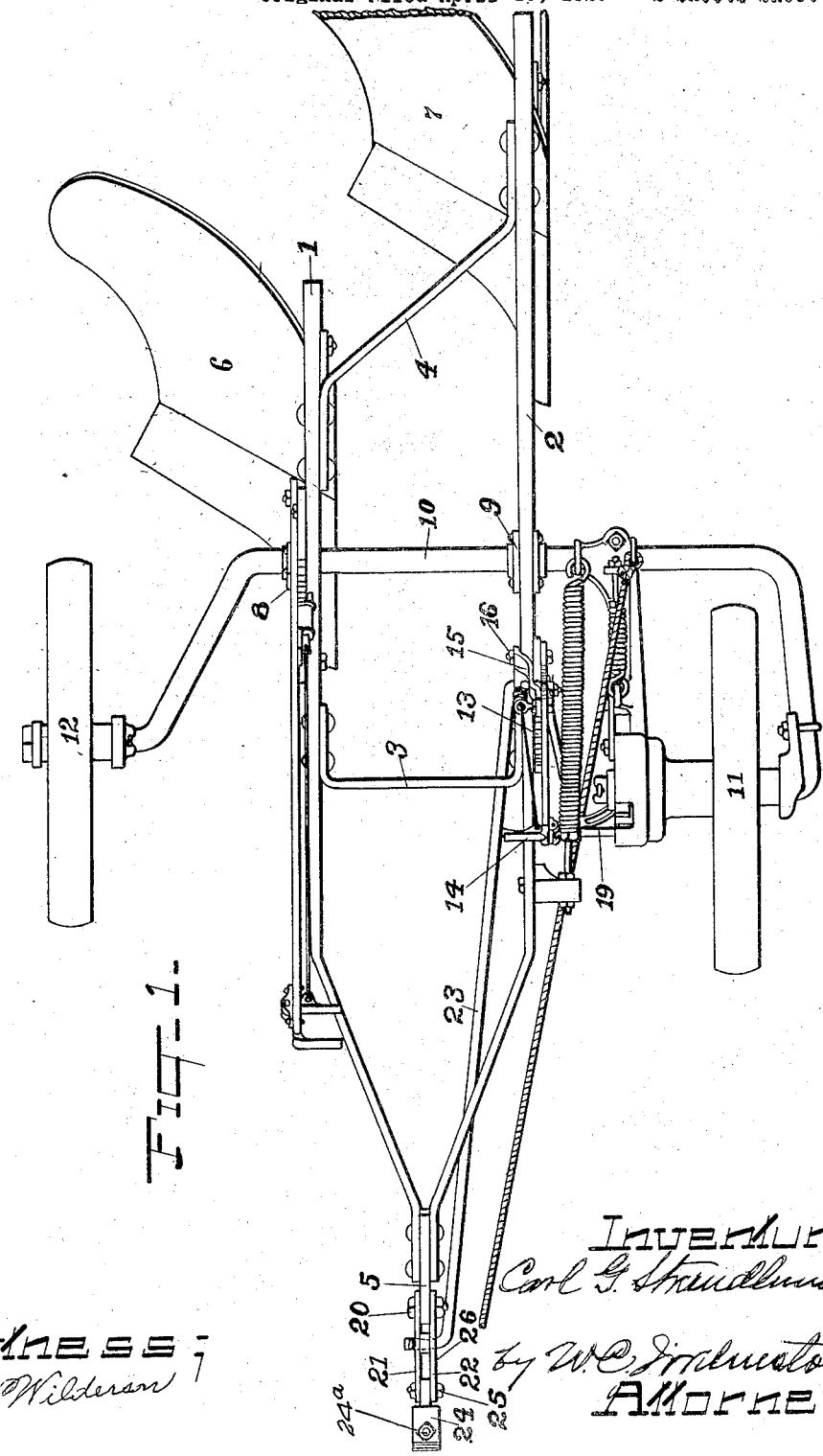

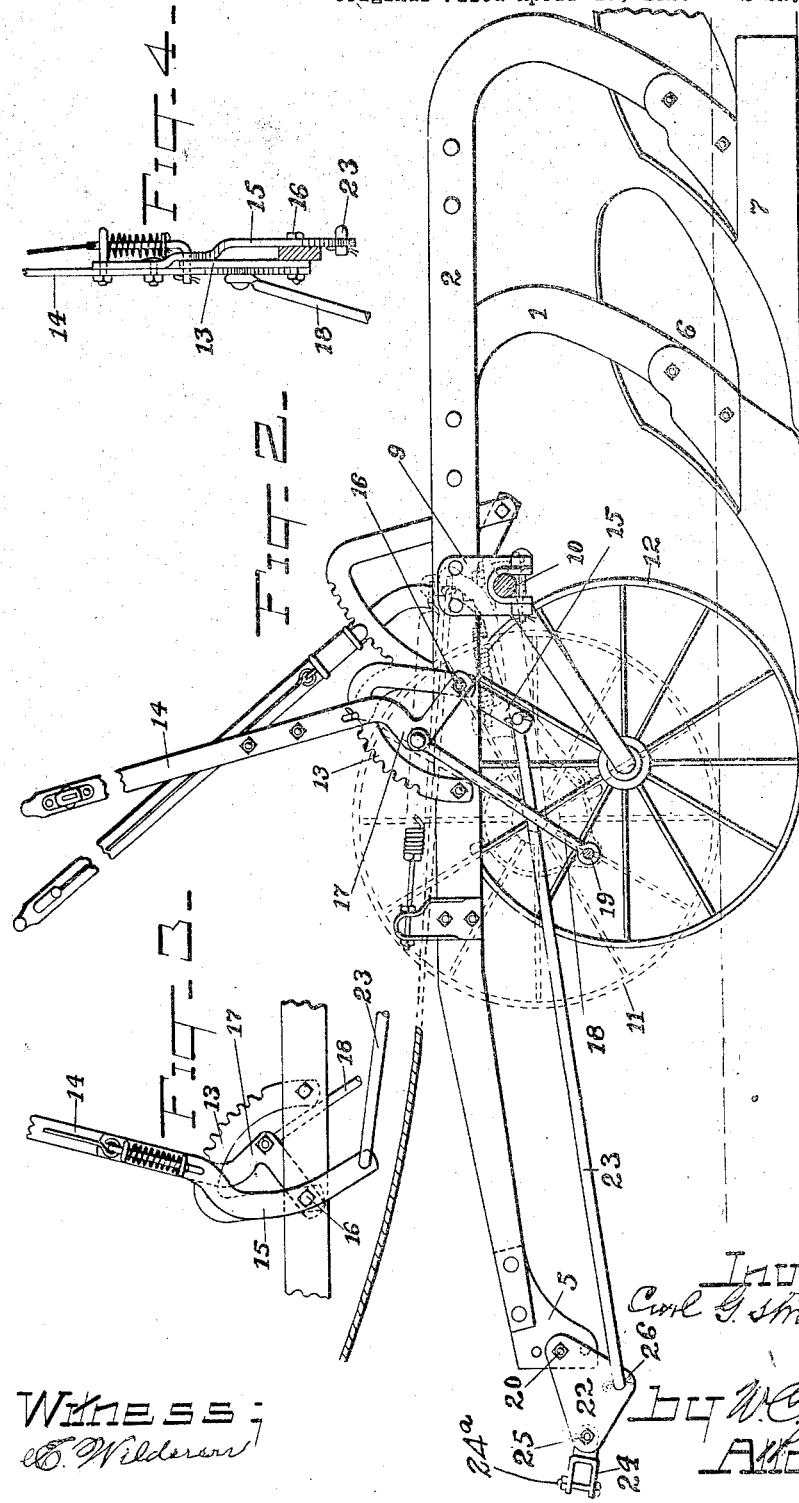

1,653,677

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

DRAFT DEVICE.

Application filed April 19, 1920, Serial No. 374,835. Renewed March 22, 1926.

My invention relates to wheeled plows and more particularly to the draft connections and the means employed to regulate the depth at which it is desired the plow shall operate, and the object of my invention is to combine the operation of raising and lowering the plow for depth with adjustment of the draft connections relatively to the rise or descent of the plow.

Referring to the drawings in which similar numerals indicate identical parts—

Figure 1 is a plan view of a wheeled plow embodying my invention.

Figure 2 is a side elevation of Figure 1 with the land-wheel removed.

Figure 3 is a detail in elevation of the operating lever viewed from the furrowward side, and Figure 4 is a rear view in detail of the operating lever and connected parts.

The plow beams 1 and 2 are spaced apart by braces 3 and 4 and have their forward ends converging to a clevis 5 to which they are securely bolted. The rear ends of the beams 1 and 2 extend downwardly and carry plow bodies 6 and 7. Suitably journaled to rock in bearings 8 and 9 on the beams 1 and 2 respectively, is an axle 10 having crank terminations on which are mounted ground wheels 11 and 12. As is well understood this axle constitutes adjustable means that supports the beams on the ground wheels. A notched segment 13 is secured on the beam 2, and a depth controlling lever 14 is pivotally mounted on the landward side of the beam 2 and is provided with a common type of latch to cooperate with the notches in the segment 13 and hold the lever in any one of its various positions of adjustment. Rigidly secured on the furrowward side of the lever 14 is an arm 15 extending below the beam 2 and pivoted intermediate its length, on the beam 2 by the bolt 16 which is also the pivot of the lever 14.

The lever 14 is bent above its pivot to form an elbow 17 to which is pivotally connected a link 18 which extends to pivotal connection with a member 19, forming part of a power lift mechanism mounted on the landward crank arm of the axle 10 and well known in the art, whereby, by operation of the lever 14 the axle 10 is rocked to relatively move the wheels vertically toward or from the beams and thereby raise or lower the plow with respect to the ground to regulate the depth at which it is desired the plow shall operate; the member 19 normally is only movable by the operation of raising or lowering the plow automatically.

Pivotally secured on opposite sides of the clevis 5 by a bolt 20 are plates 21 and 22 forming a rocking trilateral power transmitting member 26 which functions as a bell crank or three armed lever. One arm of said member is connected with the lower termination of the arm 15 by a rod 23, and between the forward ends of the plates 21 and 22 a draft coupling 24 is pivotally secured by a bolt 25 and adapted to be connected with the power employed to draw the plow.

As shown in Figures 1 and 2 the draft coupling 24 is preferably in the form of an ordinary shackle adapted to be pivotally connected at a fixed point to the draft device usually provided at the rear of a tractor, by a bolt or pin $24^a$. From the fixed draft point or pin $24^a$ of the draft coupling 24 the propelling force is transmitted to the beam of the plow structure and to the plows, and it is transmitted along the "line of draft." And all of the parts of the plow structure should be so proportioned and dimensioned and related in position to such fixed draft point of the coupling 24, that the line of draft is properly established and maintained. This line extends from the median point of the resistances met by the plow bodies (when they are plowing and bearing against the earth) forward and upward to the point from which the power is transmitted from the external propelling agency. The design of the plowing structure (including the earth contacting parts of the body, the carrying beams and the adjunct parts by which they are supported and adjusted) is such that when the bodies are adjusted from a position for one depth of plowing to a position for another depth, the line of draft will remain approximately constant in relation to the point of power application above specified. If the part of said line near that point is elevated or lowered when the plow structure is adjusted for different depths, the pull upon the points of the plow bodies will tend to cause them to move up or down into improper positions. The lever at 14 and the link at 18 can be utilized by the operator at any time to elevate or lower the structure so that the bodies can be adjusted, vertically, from one line of plowing to another line, and thus have the depth of plowing varied. But the front part of the beam frame should be free to move bodily up or down during this varying, vertically, of the positions of the bodies, without affecting the forward, upper part of the line of draft. That is to say, the front end of the plow structure should be capable of moving up or down as the plow bodies are placed at different plowing depths in order to maintain their bottoms level; and the propelling force should be imparted to the beam from the external draft device without vertically varying or deflecting the line of draft. Heretofore, wheeled plow structures have included means for elevating or lowering the plow bodies relatively to the wheels. But in all cases within my knowledge the front end of the beam structure has been held fixed, vertically, at an axis around which the bodies swing vertically, or that end of the beam structure has been so connected to the external draft device in front of it that the latter was carried with the beam end vertically at the times when the bodies were adjusted for variation in depth, and this vertical movement of the propelling device in front of the beam dislocates the true "line of draft". Such dislocating of this line is obviated by employing the pivoted member 26 and the rod 23 in the present construction. These allow the plow structure, including the bodies and the front end of the beam element, to be moved bodily, vertically, through the range of the several predetermined plowing depths, without breaking the power transmitting connection between the power imparting and the power receiving parts during the beam's vertical movements, and without varying, vertically, the position of the point of power application, that is without dislocating the line of draft.

In another application, No. 371,245, filed April 5, 1920, by myself and Theophilus Brown, there is illustrated another of the several forms of mechanisms by which these purposes can be attained. In that case the front end of the beam system is provided with a vertical slotway in which is positioned the power applying device, the slot permitting vertical adjustment of the beam without affecting the line of draft and the draft is applied directly to the beam.

In the present mechanism the draft is transmitted to the beam through the pivoted member but in both cases the draft coupling is maintained substantially in the line of draft notwithstanding vertical adjustment of the front end of the beam incident to adjustment of the depth of plowing. Consequently, the bottoms of the plow bodies maintain their level position when operating at any depth within their range of adjustment.

I do not limit myself to a trilateral member, as shown, for it is evident that other forms may be used.

What I claim is—

1. In a plow, the combination with a beam, a furrow opener carried thereby, a ground engaging wheel, adjustable means supporting the beam on said wheel, and means for adjusting said supporting means to move the wheel vertically relatively to the beam, to vary the depth of plowing, of means for transmitting the draft of a propelling member to the plow comprising a draft coupling, and power transmitting means interposed between said draft coupling and the beam and pivotally connected therewith and with said depth adjusting means, and adapted to be actuated to move the front end of the beam vertically when said depth adjusting means is operated to vary the depth of plowing.

2. In a plow, the combination with a beam, a furrow opener carried thereby, a ground engaging wheel, adjustable means supporting the beam on said wheel, and means for adjusting said supporting means to move the wheel vertically relatively to the beam, to vary the depth of plowing, of means for transmitting the draft of a propelling member to the plow comprising a draft coupling, power transmitting means interposed between and connecting said draft coupling and the beam, for transmitting the draft from said coupling to the beam, and adapted to be actuated to permit vertical adjustment of the front end of the beam, and means controlled by said depth adjusting means and connected with said power transmitting means for normally holding the front end of the beam against vertical movement, and operating when the plowing depth is varied, to actuate said power transmitting means to move the front end of the beam vertically relatively to said draft coupling.

3. In a plow, the combination with a beam, a furrow opener carried thereby, a ground engaging wheel, adjustable means supporting the beam on said wheel, and depth adjusting means operable to adjust said supporting means to move the beam vertically to vary the depth of plowing, of a draft coupling, a lever fulcrumed on the beam and pivotally connected with said coupling, said lever serving to transmit the draft to the beam, and means connected with said lever and said depth adjusting means, for actuating said lever to move the forward end of the beam vertically when the furrow opener is adjusted to vary the depth of plowing.

4. In a plow, the combination with a beam, a furrow opener carried thereby, a ground engaging wheel, adjustable means supporting the beam on said wheel, and depth adjusting means operable to adjust said supporting means to vary the depth of plowing, of means for transmitting the draft of a propelling member to the plow comprising a three armed lever positioned in the line of draft, one of the arms of said lever being pivotally connected with the beam, a draft coupling pivotally connected with another arm of said lever, and means connecting the third arm of said lever with said adjusting means and operating to actuate said lever to move the front end of the beam vertically when said supporting means is adjusted to vary the depth of plowing.

5. In a plow, the combination with a beam, a furrow opener carried thereby, a ground engaging wheel, means supporting the beam on said wheel, and means for adjusting said supporting means to vary the depth of plowing, of means for transmitting the draft of a propelling member to the plow comprising a three armed lever adapted to operate in a vertical plane and having one of its upper arms pivotally connected with the front end portion of the beam, a draft coupling pivotally connected with another upper arm of said lever, and means connecting the lower arm of said lever with said adjusting means and operating to actuate said lever when said supporting means is adjusted to vary the depth of plowing.

6. In a plow, the combination with a beam, a furrow opener carried thereby, a ground engaging wheel, means supporting the beam on said wheel, a lever for adjusting said supporting means to vary the depth of plowing, and a latch for locking said lever in its different positions of adjustment, of means for transmitting the draft of a propelling member to the plow comprising a three armed lever positioned in the line of draft and having one of its arms pivotally connected with the front end portion of the beam, a draft coupling pivotally connected with another arm of said lever, and a rod connecting the third arm of said lever with said depth varying lever for rocking said three armed lever when said depth varying lever is actuated to vary the depth of plowing.

7. In a plow the combination with a beam, a furrow opener carried thereby, means supporting the beam and adapted to be rocked to raise or lower the same, and means for adjusting said supporting means to move the beam vertically to vary the depth of plowing, of a draft coupling, a bell crank lever fulcrumed intermediately on the front portion of the beam to swing in a vertical plane, said lever having a forwardly extending arm pivotally connected with said draft coupling and arranged to transmit the draft to the beam, and means actuated by the operation of said depth adjusting means for rocking the said lever and operating normally to hold said lever against rocking.

8. In a plow, the combination with a beam, a furrow opener carried thereby, a ground engaging wheel, adjustable means supporting the beam on said wheel, and depth adjusting means operable to adjust said supporting means to move the beam vertically to vary the depth of plowing, of a draft coupling, a bell crank lever fulcrumed on the beam, and connected with said coupling and with said depth adjusting means, said lever being so connected with said coupling and said depth adjusting means that vertical adjustment of the supporting wheel moves said lever upon its fulcrum.

CARL G. STRANDLUND.